Dec. 22, 1925.

J. PARZIALE 1,567,011

HAIR TRIMMING GUIDE

Original Filed Feb. 6, 1925

WITNESSES

INVENTOR
Jean Parziale,
BY
ATTORNEYS

Patented Dec. 22, 1925.

1,567,011

UNITED STATES PATENT OFFICE.

JEAN PARZIALE, OF NEW YORK, N. Y.

HAIR-TRIMMING GUIDE.

Original application filed February 6, 1925, Serial No. 7,355. Divided and this application filed October 12, 1925. Serial No. 62,133.

*To all whom it may concern:*

Be it known that I, JEAN PARZIALE, a citizen of the United States of America, and resident of the city of New York, Richmond Hill, borough of Queens, in the county of Queens and State of New York, have invented a new and Improved Hair-Trimming Guide, of which the following is a full, clear, and exact description.

This invention has relation to guides for use in trimming the hair, the same being a division of my prior application, Serial No. 7,355, filed February 6, 1925, and having particular reference to a means for facilitating the trimming of men's sideboards.

Primarily the invention comprehends a device for accurately facilitating the trimming of men's sideboards whereby to insure a uniform shaping and cutting of the hair around the ears and at the opposite sides of the head in front of the ears.

As a further object the invention comprehends a hair trimming guide which is comparatively simple in its construction and mode of use, which is inexpensive to manufacture, and which is highly efficient in its purpose.

With the above recited and other objects in view, reference is had to the following specification and accompanying drawings, in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1:
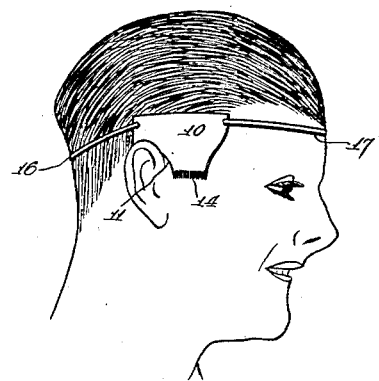
Figure 1 is a perspective view of a hair trimming guide for sideboards illustrating the same in applied position to the head.
Figure 2:
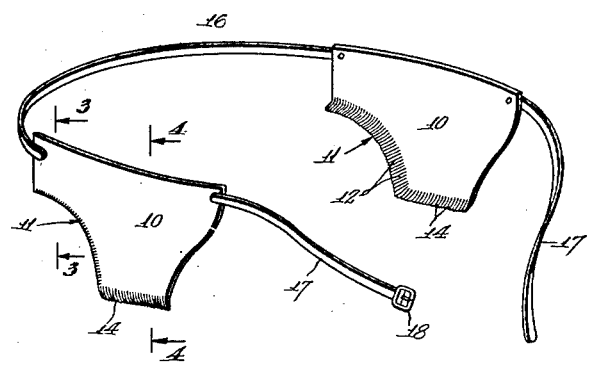
Fig. 2 is a perspective view of the device removed from the head.
Figure 3:
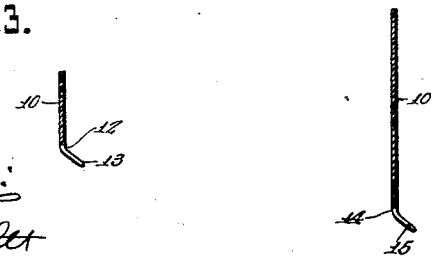
Fig. 3 is a sectional view therethrough taken approximately on the line 3—3 of Fig. 2.
Figure 4:
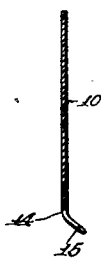
Fig. 4 is a similar view taken approximately on the line 4—4 of Fig. 2.

Referring to the drawings by characters of reference, a pair of sideboard trimming guides 10 are provided each of which is formed with an upwardly and rearwardly curved, inwardly directed edge 11 having comb teeth 12 with angular inwardly disposed terminals 13 to guide the person in trimming around the ears from the lower end of the sideboards. The lower edge of each member 10 is also provided with a series of parallel comb teeth 14 having angularly inwardly projecting terminals 15 for properly guiding the person in feathering off the lower edges of the sideboard while the free terminals of said teeth serve as a means for guiding the point at which the shaving of the sideboards is started. The sideboard trimming means consists of a pair of these guide elements 10 which are connected by a strap or band section 16 at the rear and a pair of strap sections 17 at the front, one of which sections is provided with a connecting and adjusting buckle 18.

In use and operation, the guides are properly applied to the head as illustrated and scissors or clippers are used to trim away the hair which projects beyond the toothed lower edges. By using the lower free ends of the teeth as a guide, the hair extending below the same is cut away and shaved to finish off the trimming operation.

What is claimed is:

1. As a new article of manufacture, a guide for trimming sideboards, comprising a pair of members each having an arcuate rear portion constituting means for guiding the user in shaving around the ears, and a lower edge having a series of parallel teeth formed with angular inwardly projecting terminals through which the portions of the sideboards to be trimmed project.

2. As a new article of manufacture, a guide for trimming sideboards, comprising a pair of members each having an arcuate rear portion constituting means for guiding the user in shaving around the ears, and a lower edge having a series of parallel teeth formed with angular inwardly projecting terminals through which the portions of the sideboards to be trimmed project, the said free lower ends of the teeth constituting means defining a line for shaving.

JEAN PARZIALE.